United States Patent [19]

Kanazawa et al.

[11] Patent Number: 4,588,198
[45] Date of Patent: May 13, 1986

[54] STEERING SYSTEM HAVING CONTROLLABLE DAMPER

[75] Inventors: Hirotaka Kanazawa; Seita Kanai, both of Hiroshima; Shirou Nakatani, Higashihiroshima, all of Japan

[73] Assignee: Mazda Motor Corporation, Hiroshima, Japan

[21] Appl. No.: 640,321

[22] Filed: Aug. 13, 1984

[30] Foreign Application Priority Data

| Aug. 20, 1983 | [JP] | Japan | 58-151955 |
| Aug. 20, 1983 | [JP] | Japan | 58-151956 |
| Aug. 20, 1983 | [JP] | Japan | 58-151957 |
| Aug. 20, 1983 | [JP] | Japan | 58-151958 |
| Aug. 20, 1983 | [JP] | Japan | 58-151959 |

[51] Int. Cl.$^4$ .......................... B62D 1/20; B62D 3/12
[52] U.S. Cl. .................................................. 280/90
[58] Field of Search ............... 280/90, 91, 92, 96.1, 280/98, 99, 771, 779, 89

[56] References Cited

U.S. PATENT DOCUMENTS

| 751,575 | 2/1904 | Veeder | 280/90 |
| 1,951,483 | 3/1934 | Knapp et al. | 280/90 |
| 2,728,581 | 12/1955 | Wildhaber | 280/90 |

FOREIGN PATENT DOCUMENTS 57-57311 4/1982 Japan.

Primary Examiner—Richard A. Bertsch
Attorney, Agent, or Firm—Burns, Doane, Swecker & Mathis

[57] ABSTRACT

A steering system in an automobile comprising a steering wheel and a steering shaft rotatable together with the steering wheel, a steering linkage connecting between spaced wheel carriers, a steering gear connecting between the steering shaft and the steering linkage for, when the steering wheel is rotated in one of the opposite directions from a neutral position, causing the steering linkage to displace in one of the opposite directions generally longitudinally thereof for steering the road wheels, an adjustable damper capable of exerting an adjusted damping force and disposed between a portion of an automobile body structure and a portion of the steering linkage for minimizing an oscillatory motion of the steering linkage in a direction generally longitudinally thereof, a valving mechanism for adjusting the damping force exerted by the damper, a detector for detecting a parameter representative of the steered condition of the road wheels and generating an output indicative of the parameter when the parameter detected thereby deviates from a predetermined quantity, and a control unit operable in response to the output from the detector for generating a control signal. The valve mechanism is activated in response to the control signal to reduce the damping force exerted by the damper.

13 Claims, 15 Drawing Figures

STEERING SYSTEM HAVING CONTROLLABLE DAMPER

BACKGROUND OF THE INVENTION

The present invention generally relates to an automobile steering system and, more particularly, to the steering system having a controllable damper effective to minimize front-wheel shimmy (i.e., low speed shimmy and tramp or high speed shimmy), front-wheel kickback and/or any other undesirable vibration being transmitted to the steering wheel.

The Japanese Laid-open Patent Publication No. 57-57311, published Apr. 6, 1982, discloses an automatically piloted vehicle that runs within the premises of a factory guided by the magnetic field developed in conductors beneath the ground surface. The vehicle disclosed therein is shown as having front road wheels and rear road wheels both being so steerable simultaneously that, when the front road wheels turn in one direction, the rear road wheel can turn in the opposite direction thereby to minimize the turning radius, that is, the radius of circle of turn required for the vehicle to turn. The front and rear road wheel systems have their own linkage systems each connecting the left-hand and right-hand road wheels together, the linkage system for the front road wheels being, however, operatively connected with a reversible servomotor that is controlled by an automatic piloting servocontrol unit in dependence on whether or not the running vehicle has deviated from a predetermined path defined by the conductors beneath the ground surface and whether or not the running vehicle should follow a curved path. The front linkage system for the front road wheels is operatively coupled with the rear linkage system for the rear road wheels by means of a connecting rod so designed as to steer the rear linkage system in the opposite sense to the front linkage system.

For minimizing the vibration of the steering system which obviously includes shimmy and kickback both resulting from external disturbances such as the presence of indents on the ground surface, the above described vehicle employs what is termed as a shimmy damper. The shimmy damper employed therein comprises a double-acting cylinder mounted at one end on the vehicle chassis, a piston member axially slidably housed in the cylinder and dividing the interior of the cylinder into two working chambers on respective sides thereof, and a piston rod connected at one end rigidly with the piston member and at the opposite end with the connecting rod. Ports communicated with the respective working chambers are fluid-connected with an external fluid switching circuit including an electromagnetically operated switching valve. The electromagnetically operated switching valve is adapted to be controlled by the automatic piloting servocontrol unit in such a way that, when and so long as the vehicle runs at a high speed which usually takes place during the straight forward run, the flow of a fluid medium from one working chamber to the other through the switching valve can be blocked or, alternatively, imparted a resistance, to substantially lock the movement of the connecting rod and, hence, the movement of both of the front and rear linkage systems. On the other hand, when and so long as the vehicle runs at a low speed which usually takes place during the turn around a curve, the electromagnetically operated switching valve is opened to permit the free flow of the fluid medium between the working chambers for the ease of steering of the front and rear road wheel systems. In other words, the damping force exerted by the shimmy damper according to the above mentioned prior art publication varies with the running speed of the vehicle and becomes great and small respectively at high speed and low speed run. According to this prior art publication, the use of the vehicle speed as a parameter for controlling the electromagnetically operated switching valve is based on the generalization that the high and low running speeds are utilized during the straight forward run and the rounding along a curved path, respectively, in view of the peculiarity of the vehicle disclosed therein.

Based on the disclosure of the above mentioned prior art publication, it can be contemplated to employ the shimmy damper in a self-propelled manned vehicle such as, for example, a four-wheeled passenger car. In such case, the shimmy damper would be mounted on the automobile so as to extend between a portion of the vehicle body structure and one of the tie rods forming the front linkage system for the front road wheels so that external disturbances acting on the front road wheels during the run of the automobile can be absorbed or substantially suppressed by the shimmy damper thereby to minimize any possible flutter and/or joggling motion of the steering wheel operatively coupled with the tie rods through a steering gear.

Although the contemplated version appears to be effective to minimize the undesirable vibratory motion of the steering wheel, however, even during the steering operation to turn the automobile along a curved path the shimmy damper may exert a relatively great damping force hampering a smooth displacement of the tie rods of the front linkage system. Once this happens, the rounding along the curved path will require the application of a greater steering force to turn the steering wheel than that required when no shimmy damper is employed. This problem appears to be notable when the automobile running at a low or medium speed attempts to round an acute curve at which time the steering wheel has to be turned a great angle about the steering column.

SUMMARY OF THE INVENTION

The present invention has been developed with a view to substantially eliminating the above discussed problem and has for its essential object to provide an improved automobile steering system effective to minimize or substantially suppress the undesirable vibrating motion of the steering wheel thereby to improve the stability of the automobile during the high speed, straight forward run without the steerability being adversely affected at all times.

Another important object of the present invention is to provide an improved automobile steering system of the type referred to above, wherein the damper used therein to absorb the front-wheel shimmy, front-wheel kickback and/or any other undesirable vibration may not require the use of any external fluid control circuit and may be employed in the form of what may be termed as a direct-acting, adjustable fluid damper, the term "adjustable" being used in the sense that the damping force exerted thereby can be adjustable as will become clear from the subsequent defined description.

A further object of the present invention is to provide an improved automobile steering system which can be readily adopted in automobiles now under production without unreasonably altering the design specification thereof.

In general, the automobile steering system comprises a steering wheel assembly, a steering linkage connecting between spaced apart wheel carriers or knuckles for the support of respective road wheels thereon, and a steering gear operatively connecting between the steering linkage and the steering wheel assembly for, when the steering wheel assembly is turned in one of the opposite directions from a neutral position, causing the steering linkage to display in one of the opposite directions generally longitudinally thereof for steering the road wheels. In accordance with the present invention and in order to accomplish the above described objects thereof, the steering system of the construction described above is provided with an adjustable damper capable of exerting an adjustable damping force and disposed between a portion of the vehicle body structure and a portion of the steering linkage for minimizing a generally lateral oscillatory motion of the steering linkage with respect to the steering wheel assembly, means for adjusting the damping force exerted by the damper, means for detecting a parameter of the steering system representative of the steered condition of the road wheels and for generating an output therefrom when the parameter detected thereby deviates from a predetermined value, and a control means operable in response to the output from the detecting means for generating a control signal, said adjusting means being activated in response to the control signal to reduce the damping force of the damper.

According to preferred embodiments of the present invention, the parameter detected by the detecting means may be the angular movement, i.e., angle of rotation, of the steering wheel forming a part of the steering wheel assembly; the displacement occurring in a motion transmitting mechanism for transmitting the rotation of the steering wheel to the road wheels, which mechanism is constituted by the steering wheel assembly and the steering linkage; the efficiency of transmission of force between the steering wheel and the road wheels; the angular displacement of the automobile such as, for example, the yawing rate, the acceleration acting in a direction laterally of the automobile or the rolling angle, or a combination thereof; the magnitude of vibration of the road wheels resulting from the wheel shimmy and/or the wheel kickback; the force of grip applied by the automobile driver to the steering wheel; or a combination of at least one of them with the running velocity of the automobile.

BRIEF DESCRIPTION OF THE DRAWINGS

These and other objects and features of the present invention will become readily understood from the following description taken in conjunction with preferred embodiments thereof with reference to the accompanying drawings, in which.

DETAILED DESCRIPTION OF THE EMBODIMENTS

Figure 1:
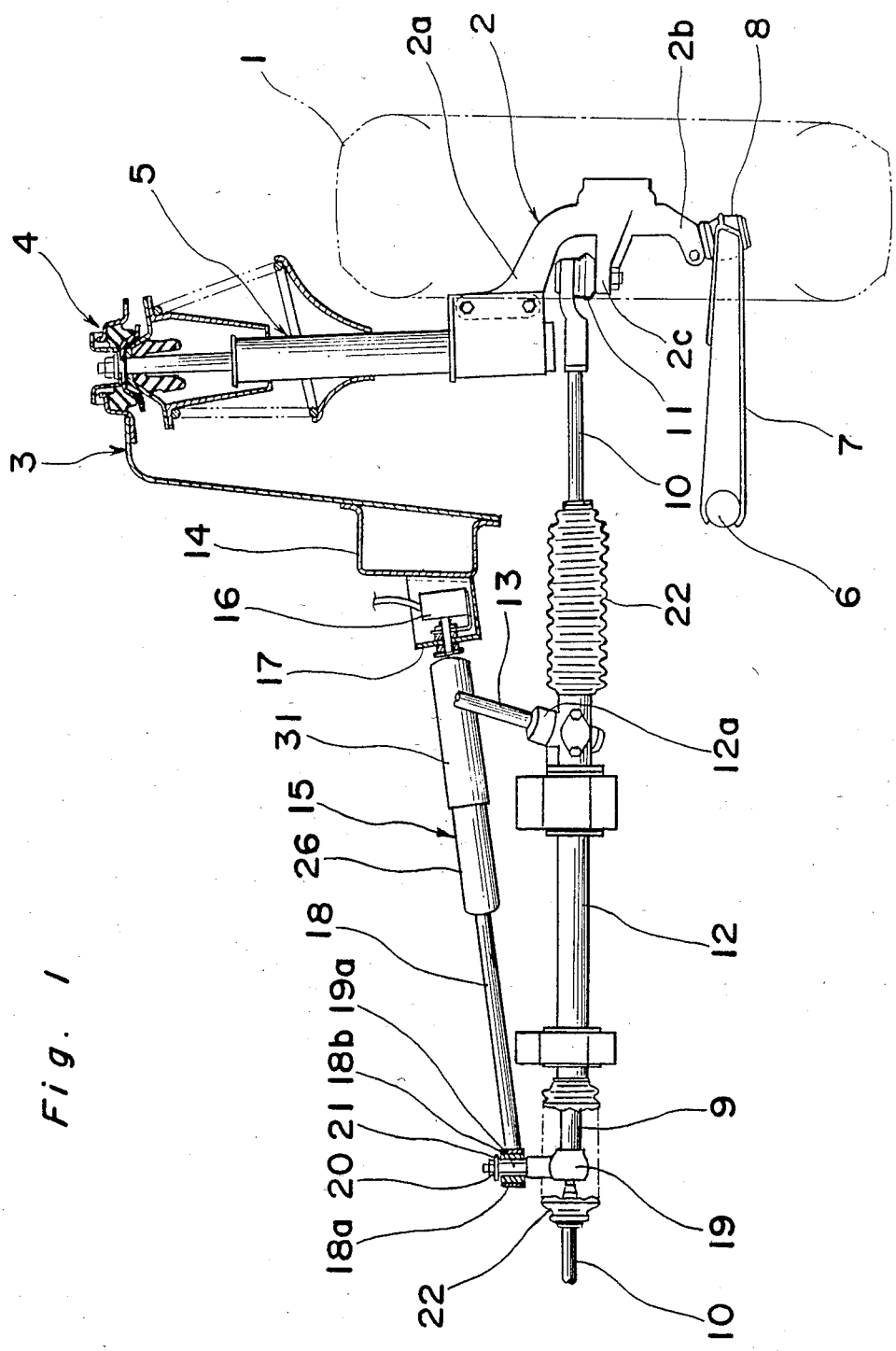
FIG. 1 is a rear elevational view, with a portion cut away, showing a steering system embodying the present invention as viewed in a direction frontwardly of an automobile.

Before the description of the present invention proceeds, it is to be noted that like parts are designated by like reference numerals throughout the accompanying drawings.

Figure 2:
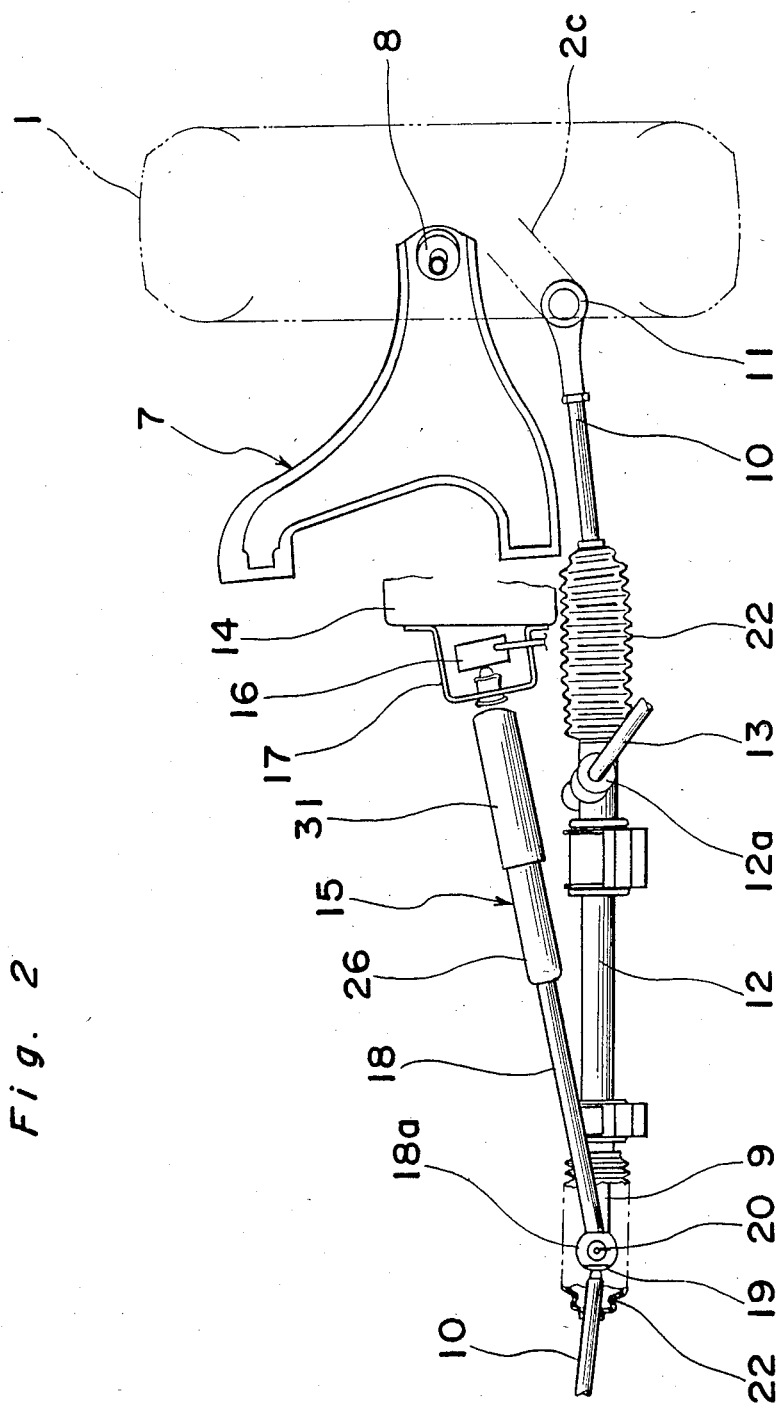
FIG. 2 is a top plan view of the steering system shown in FIG. 1.

Referring first to FIGS. 1 and 2, there is shown only one of the front road wheels, for example, the right-hand front road wheel 1, by the phantom line for the sake of brevity, it being, however, to be noted that the non-illustrated, left-hand front road wheel is supported in a manner similar to the right-hand front road wheel 1 as described below.

The road wheel 1 is rotatably mounted on a knuckle 2 having an upper arm 2a coupled to a shock absorber assembly 5, and a lower arm 2b pivotally coupled to a lower control arm 7 by means of an elastic mount 8. The shock absorber 5 is in turn connected through an elastic mount 4 with a suspension tower 3 fast or integral with an automobile body structure (not shown) while the lower control arm 7 is in turn pivotally connected through a spindle 6 to a portion of the automobile body structure. The knuckle 2 also has an intermediate arm 2c extending inwardly in a direction opposite to the axle, on which the road wheel 1 is mounted, and inclined relative to the longitudinal axis of the axle.

While the right-hand front road wheel 1 is supported in the manner as hereinbefore described, the left-hand front road wheel, not shown, is also supported in a similar manner as described in connection with the right-hand front road wheel 1. In any event, the manner by which the road wheels are supported may be of any known construction.

The intermediate arms 2c integral with the respective knuckles 2 for the right-hand and left-hand road wheels are connected together by means of a steering linkage. This steering linkage so far shown comprises a connecting rod 9 having a toothed rack area defined therein at a substantially intermediate portion, and a pair of spaced tie rods 10 pivotally connected at one end to the opposite ends of the connecting rod 9 so as to extend in a direction away from each other and at the other end to the intermediate arms 2c through elastic mounts 11. The substantially intermediate portion of the connecting rod 9 including the toothed rack area (not shown) extends axially slidably through a tubular gear housing 12 rigidly secured to the underside of the automobile body structure. The gear housing 12 carries, or otherwise is integrally formed with, a bearing assembly 12a for the support of a pinion (not shown) in meshed relation with the toothed rack area on the connecting rod 9, said pinion being mounted rigidly on, or otherwise formed integrally with a steering shaft 13 which extends upwardly from and generally perpendicularly to the steering linkage. The steering shaft 13 has an upper end, remote from the pinion, provided with a steering wheel (not shown) for rotation together therewith. As a matter of design choice, the steering shaft 13 may not be coupled direct with the pinion, but may be coupled therewith through an intermediate shaft that connects between the steering shaft and the pinion.

The pinion fast with the steering shaft 13 and the toothed rack area on the connecting rod 9 together constitute a steering gear of rack and pinion type. This steering gear so far described and shown may also be of any known construction. It is to be noted that reference numerals 22 represent dust protective rubber gaiters enclosing the respective joints between the left-hand tie rod 10 and one end of the connecting rod 9 and between the right-hand tie rod 10 and the other end of the connecting rod 9.

In the construction so far described, it is clear that, when the steering wheel is rotated in one of the opposite directions from a neutral position, the pinion being rotated together with the steering shaft 13 causes the connecting rod 9 and, hence, the steering linkage as a whole, to displace in one of the opposite lateral directions thereby steering the front road wheels in one of the leftward and rightward directions dependent on the direction of rotation of the steering wheel. In this way, the automobile can be turned either leftward or rightward for the cornering.

Should any undesirable vibration such as front-wheel shimmy and/or kickback occur in the road wheels 1, it tends to be transmitted through the steering linkage to the steering wheel which then undergoes a shaking motion generally in all directions. The excessive shaking motion of the steering wheel particularly during a high speed straight toward run often adversely affects the steerability of the automobile and the stabilized drive. A mechanism of the transmission of the undesirable vibration from the road wheels to the steering wheel is complicated as the cause of the undesirable vibration is many as is well known to those skilled in the art, but the shaking motion of the steering wheel can be minimized if the oscillatory motion of the steering linkage in a direction generally laterally of the steering shaft resulting from the undesirable vibration of the road wheels is minimized or suppressed.

In accordance with the present invention, a damper 15 is employed for minimizing the lateral oscillatory motion of the steering linkage. The damper 15 so far shown is possibly termed as a direct-acting, adjustable fluid damper capable of exerting an adjusted damping force and, while the details will be subsequently described with particular reference to FIGS. 3 and 4, generally comprises a stone shield 31 and a sealed rebound tube assembly 26 partially telescopically received in the stone shield 31. The stone shield 31 has one end connected to a mounting bracket 17 fast with the suspension tower 3 in a manner as will be described later, and the other end through which the sealed rebound tube assembly is partially received for movement in a direction axially thereof. One end of the rebound tube assembly 26 remote from the stone shield 31 is pivotally connected through a damper rod 18 to a connecting member 19 which is in turn rigidly mounted on a left-hand end of the connecting rod 9 protruding out of the gear housing 12. Specifically, the connecting member 9 rigid on the connecting rod 9 is integrally formed with a bearing stud 19a that relatively rotatably extends through an eye 18a integral, or otherwise rigid, with one end of the damper rod 18 remote from the tube assembly 26. Preferably, an annular rubber mount 18a is interposed between the inner peripheral surface of the eye 18a and the peripheral surface of the bearing stud 19a to permit the damper rod 18 to pivot resiliently yieldingly about the bearing stud 19a. The eye 18a so mounted on the bearing 19a is retained in position by a lock nut 20 which is, after a washer 21 has been mounted on the bearing stud 19a, threaded to a threaded free end of the bearing stud 19a.

The mounting bracket 17 is of a generally U-shaped or, alternatively, cup-shaped configuration and is firmly welded to a U-sectioned rigid member 14 also firmly welded to the suspension tower 3. The mounting bracket 17 so secured to the rigid member 14 defines a motor chamber between it and the rigid member 14, in which chamber a reversible stepper motor 16 is accommodated in a manner as will be described later.

Figure 3:
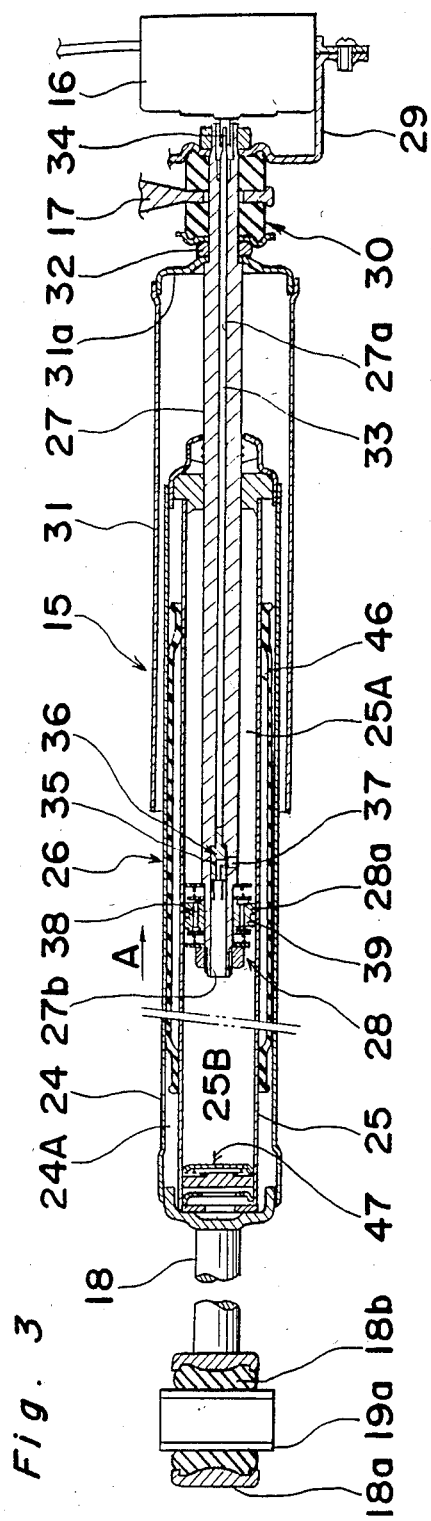
FIG. 3 is a longitudinal sectional view of a direct-acting, adjustable fluid damper used in the steering system.
Figure 4:
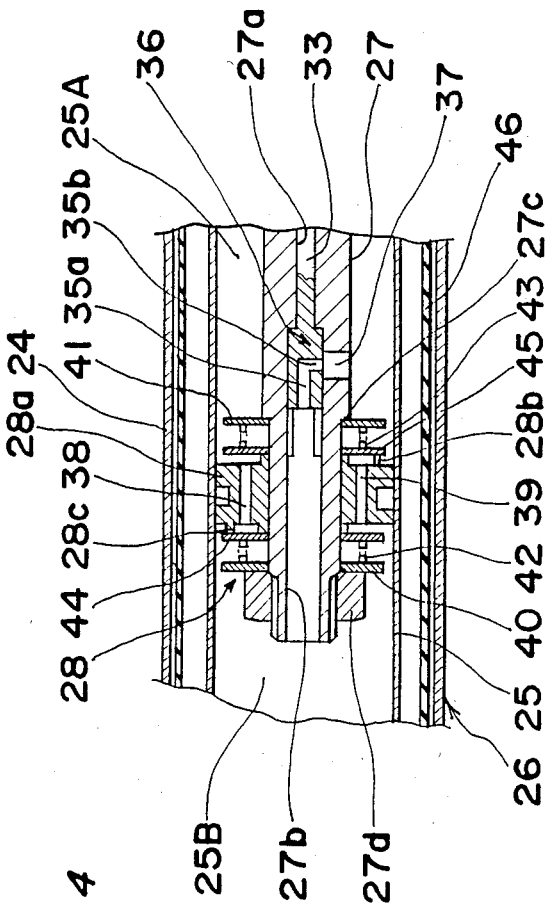
FIG. 4 is a longitudinal sectional view, on an enlarged scale, of an essential portion of the damper shown in FIG. 3.

Referring now to FIGS. 3 and 4 showing the details of the damper 15, the sealed rebound tube assembly 26 is of a double-walled structure including an inner or pressure tube 24 and an outer or reservoir tube 25 one inside the other with a reservoir chamber 24A defined between these tubes 24 and 25. This reservoir chamber 24A is communicated with the interior of the pressure tube 25 through a flow regulating valve 47 disposed within the tube assembly 26 at one end adjacent the damper rod 18. This flow regulating valve 47 may be of any known structure and is generally similar to that conventionally used in a direct-acting, fluid-sealed shock absorber, and therefore, the function and purpose thereof are well known to those skilled in the art. A fluid medium sealed within the tube assembly 26 is preferably a hydraulic oil.

Within the reservoir chamber 24A, a diaphragm sleeve 46 is coaxially disposed with its opposite ends sealed to the outer peripheral surface of the pressure tube 25 and contains air between it and the pressure tube 25, the function of which will be described later.

The damper 15 also includes a piston rod 27 having an outer end portion extending through the wall of the mounting bracket 17 and carried by said wall of the bracket 17 through a rubber mount 30. To the outer end of the piston rod 27 located on one side of the wall of the bracket 17 opposite to the tube assembly 26 and within the motor chamber, a generally L-shaped motor mount 29 is rigidly secured. On the other hand, the stone shield 31 is rigidly mounted on the piston rod 27 by means of an end plate 31a contacting the rubber mount 30 through a spacer ring 32 positioned on the other side of the wall of the bracket 17 adjacent the tube assembly 26. It is to be noted that the end plate 31a of the stone shield 31 and the motor mount 29 are so positioned relative to the outer end portion of the piston rod 27 as to compress the rubber mount 30 axially inwardly, wherefor the piston rod 27 will not appreciably move axially relative to the bracket 17 even though it is permitted to jolt slightly by the resiliency of the rubber mount 30.

The piston rod 27 relatively axially slidably extends into the tube assembly with the other, i.e., inner, end portion thereof situated within the pressure tube 25. As best shown in FIG. 4, the inner end portion of the piston rod 27 is radially inwardly stepped at 27c to provide a reduced diameter portion on which a piston assembly 28 is mounted as will be described later.

The piston rod 27 has an axial bore 27a defined therein over the entire length thereof in alignment with the longitudinal axis thereof, one end of said axial bore 27a adjacent the inner end of the piston rod 27 being radially outwardly enlarged as shown by 27b. A valving shaft 33 having one end integrally formed with a valve head 36 of an outer diameter substantially equal to the diameter of the enlarged bore portion 27b in the piston rod 27 extends rotatably, but axially non-movably through the axial bore 27a with the valve head 36 positioned within the enlarged bore portion 27b. The other end of the valving shaft 27 is coupled through a joint 34 with a drive shaft of the reversible stepper motor 16 rigidly mounted on the motor mount 29. The valve head 36 is formed therein with a generally L-shaped passage 35 comprised of an axial passage portion 35a, communicated with the enlarged bore portion 27b, and a radial passage portion 35b which can be brought selectively into and out of alignment with a radial passage 37, defined in the wall of the piston rod 27 so as to extend radially of the piston rod 27, one at a time depending on the position of the stepper motor 16.

The details of the piston assembly 28 will now be described with particular reference to FIG. 4. The piston assembly 28 comprises a piston body 28a rigidly mounted on the reduced diameter portion of the piston rod 27 so as to divide the interior of the pressure tube 25 into first and second working chambers 25A and 25B. This piston body 28a has, so far shown, a pair of passages 38 and 39 defined therein so as to extend in parallel to the piston rod 27 and spaced 180° from each other about the piston rod 27. The opposite end faces of the piston body 28a are formed with generally annular valve seats 28b and 28c, respectively, projecting outwardly therefrom in a direction away from each other, the valve seat 28b being coaxially aligned with one end of the passage 39 adjacent the first working chamber 25A while the valve seat 28c is coaxially aligned with one end of the passage 38 adjacent the second working chamber 25B.

On respective sides of the piston body 28a, there is disposed first and second check valves which normally close the passages 38 and 39, respectively, but are operable to alternately open the passages 38 and 39. The first check valve comprises a ring-shaped spring seat 40 and a ring-shaped valve plate 44, both mounted on the reduced diameter portion of the piston rod 27 between one end face of the piston body 28a adjacent the second working chamber 25B and a nut member 27d exteriorly threaded to the reduced diameter portion of the piston rod 27. By the action of a compression spring 42 disposed between the spring seat 40 and the valve plate 44, the valve plate 44 is normally seated against the annular valve seat 28c to close the passage 38. On the other hand, the second check valve, identical in structure with the first check valve, comprises a ring-shaped spring seat 41, a ring-shaped valve plate 45 and a compression spring 43, all disposed on the reduced diameter portion of the piston rod 27 between the other end face of the piston body 28a adjacent the first working chamber 25A and the raiser 27c, said compression spring 43 urging the valve plate 45 to seat against the annular valve seat 28b to close the passage 39.

The first and second check valves are so designed and so operable that, when the fluid medium within the working chamber 25A becomes higher in pressure than that in the working chamber 25B by the reason which will be described later, the fluid medium within the working chamber 25A can flow into the passage 28c to urge the valve plate 44 against the compression spring 42 thereby to establish the fluid circuit between the working chambers 25A and 25B through the passage 38. Similarly, the fluid circuit between these working chambers 25A and 25B through the passage 39 can be established in a manner reverse to that described above, when the pressure within the working chamber 25B becomes higher than that within the working chamber 25A.

While the manner by which the stepper motor 16 is controlled will be described latter, the damper 15 of the construction so far described with reference to FIGS. 3 and 4 operates in the following manner. Assuming that the valve head 36 is held in position with the radial passage portion 35b out of alignment with the radial passage 37 and, therefore, the fluid circuit between the working chambers 25A and 25B through the enlarged bore portion 27b in the piston rod 27 is interrupted, the relative axial displacement between the piston assembly 28 and the tube assembly 26 can be regulated by only one of the passages 38 and 39 depending on the direction of the relative displacement. Specifically, when the radial passage portion 35b is out of alignment with the radial passage 37, and when the tube assembly 26 is subsequently axially displaced relative to the piston assembly 28 in a direction shown by the arrow A in FIG. 3, that is, in a direction close towards the stone shield 31, the fluid medium inside the second working chamber 25B is compressed and, as a result thereof, the second check valve including the valve plate 45 is opened to establish the fluid circuit through the passage 39 in the manner as hereinbefore described, thereby permitting the fluid medium to flow into the working chamber 25B through the passage 39.

At the same time, since the displacement of the tube assembly 26 relative to the piston assembly 28 in that direction A results in the reduction of the volume of the pressure tube 25 by a quantity generally determined by the volume of that portion of the piston rod 27 which has projected into the interior of the pressure tube 25, the fluid medium being compressed within the second working chamber 25B partially leaks through the flow regulator 47 into the reservoir chamber 24A and the resultant increase in pressure inside the reservoir chamber is then absorbed by the compressible air inside the air chamber bound by the diaphragm sleeve 46 exteriorly of the pressure tube 25.

On the other hand, if the tube assembly 26 displaces relative to the piston assembly 28 in a direction opposite to the direction A while the radial passage portion 35b is out of alignment with the radial passage 37, the damper 15 operates in a manner reverse to that described above in connection with the displacement of the tube assembly in the direction A. Specifically, at this time, the first check valve including the valve plate 44 is opened to establish the fluid circuit through the passage 38 thereby permitting the fluid medium being then compressed within the working chamber 25A to flow into the working chamber 25B and, on the other hand, the fluid medium within the reservoir chamber 24A leaks into the interior of the pressure tube 25, that is, the working chamber 25B, in a quantity sufficient to compensate for the increase of the volume of the pressure tube 25.

The foregoing operation of the damper 15 takes place even when the valve head 36 is brought into a position to align the radial passage portion 35b with the radial passage 37. However, the difference is that the damping force exerted by the damper 15 is greater when the radial passage portion 35b is out of alignment with the radial passage 37 than when it is aligned with the radial passage 37 by the reason which can readily be understood by those skilled in the art. Thus, it will be understood that the damper 15 according to the present invention includes means for adjusting the damping force exerted thereby, which adjusting means is generally constituted by the stepper motor 16 and the valve head 36 controlled thereby.

Figure 5:
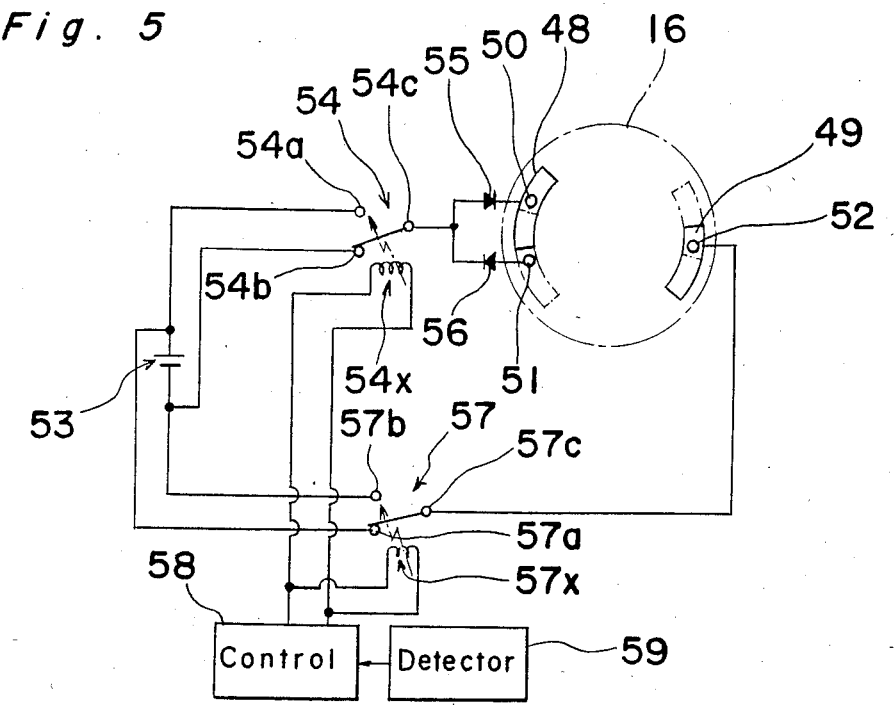
FIG. 5 is a schematic electric circuit for controlling a stepper motor used in association with the damper shown in FIG. 3.

Referring to FIG. 5, there is shown a control circuit for controlling the stepper motor 16 in dependence on a parameter representative of the steered condition of the road wheels. In the embodiment shown in and described with reference to FIG. 5, the reversible stepper motor 16 having its output drive shaft coupled with the previously described valve head 36 through the valving shaft 33 can be rotated through a predetermined angle smaller than 360° between first and second positions at which the radial passage portion 35b in the valve head 36 is out of and in alignment with the radial passage 37, respectively.

As shown, the stepper motor 16 has a pair of spaced, generally arcuate electrode members 48 and 49 both rotatable in association with the rotation of the motor 16. In practice, these electrode members 48 and 49 are rigidly mounted on an electrically insulating disc (not shown) which is in turn mounted on the drive shaft of the motor for rotation together therewith, and are electrically connected with a coil of the motor 16.

Cooperative with the electrode member 48 is a pair of spaced fixed contacts 50 and 51, said contact 50 contacting the electrode members 48 when the motor 16 is in the first position corresponding to the straight forward run of the automobile while said contact 51 can contact the electrode member 48 when the motor 16 is in the second position corresponding to the cornering of the automobile. On the other hand, cooperative with the electrode member 49 is a fixed contact 52 held in contact with the electrode member 49 at all times regardless of the position of the motor 16. These fixed contacts 50, 51 and 52 are supported by, for example, an annular carrier plate which is secured to, for example, the motor mount 29 (FIG. 3) in face-to-face relation to the electrode carrier disc (not shown).

The fixed contacts 50 and 51 are connected to a movable contact member 54c of a first relay switch assembly 54 through diodes 55 and 56, respectively. These diodes 55 and 56 are arranged in opposite relation to each other so that the electric current can flow in one direction from the movable contact member 54c to the fixed contact 50 through the diode 55 and from the fixed contact 51 to the movable contact member 54c through the diode 56.

The relay switch assembly 54 including the movable control member 54c also includes a pair of spaced fixed terminals 54a and 54b, which are connected to the positive and negative poles of a battery power source 53, and a relay coil 54x connected to a control unit 58. The movable contact member 54c is normally engaged to the fixed terminal 54b, but is moved to and is held in engagement with the fixed terminal 54a when and so long as the relay coil 54x is energized in response to a control output from the control unit 58.

The fixed contact 52 is connected to a movable contact member 57c of a second relay switch assembly 57. Like the first relay switch assembly 54, the second relay switch assembly 57 includes a pair of spaced fixed terminals 57a and 57b, connected to the positive and negative poles of the same battery power source 53, and a relay coil 57x connected to the control unit 58. The movable contact member 57c is normally engaged to the fixed terminal 57a, but can be moved to and held in engagement with the fixed terminal 57b when and so long as the same control output is fed from the control unit 58 to the relay coil 57x to energize the latter.

In the construction described above, when and so long as the automobile runs straight forward, no control signal emerges from the control unit 58. In this case, the movable contact members 54c and 57c of the respective first and second relay switch assemblies 54 and 57 are held as shown and the electrode members 48 and 49 are held at a position shown by the solid line. In this condition, because of the diode 55 inhibiting the flow of the current from the contact 50 in engagement with the electrode member 48 towards the movable contact member 54c, no electric power will not be supplied to the motor 16. Under these circumstances, the valve head 36 is in position to interrupt the communication between the radial passage portion 35b and the radial passage 37 and, consequently, the damper 15 exerts a great damping force to minimize the lateral oscillatory motion of the steering linkage.

However, if the control output is generated from the control unit as a result of the detection of the steered condition of the road wheels 1 as will be described later, the relay coils 54x and 57x are simultaneously energized to bring the movable contact members 54c and 57c into engagement with the fixed terminals 54a and 57b, respectively. The engagement of the movable contact members 54c and 57c with the respective fixed terminals 54a and 57b results in the reversal of the direction of flow of the current with respect to that during the engagement thereof with the fixed terminals 54b and 57a, and the motor 16 is, therefore, rotated from the first position towards the second position to cause the valve head 36 to communicate the radial passage portion 35b with the radial passage 37. Simultaneously with the rotation of the motor 16, the electrode members 48 and 49 move angularly from the solid line position towards a position shown by the chain line. While the electrode member 49 is held in contact with the fixed contact 52 at all times, the electrode member 48 being angularly moved towards the chain line position disengages from the fixed contact 50 and is brought into contact with the fixed contact 51 at the time the motor 16 has completed its rotation to the second position. Unless the control signal from the control unit 58 disappear as a result of the return of the automobile to the straight forward run, the motor 16 is kept in the second position, permitting the minimized resistance to the relative displacement of the piston assembly 28. Accordingly, the damper 15 exerts a small damping force to facilitate the ready rotation of the steering wheel and, hence, the lateral displacement of the steering linkage for the steering of the road wheels 1.

Referring still to FIG. 5, the control unit 58, although not shown in detail, comprises a switching circuit including an electric power source, which may be an automobile battery for the electric system of the automobile, and a switching transistor for selectively establishing and interrupting the power supply from the power source, that is, the supply of the control signal, to the relay coils 54x and 57x in response to the presence and absence of an output from a detector circuit 59.

In a simple form of the present invention, the detector circuit 59 is so designed as to detect the parameter representative of the steered condition of the road wheels 1 and to generate its output only when the parameter deviates from a predetermined value. The parameter referred to above includes the angle of rotation of the steering wheel, the force of grip the automobile driver applies to the steering wheel when the latter is rotated, the displacement of the linkage system comprised of the tie rods 10 and the connecting rod 9, the torque produced about the steering shaft, the yawing rate of the automobile, the rolling angle of the automobile, the acceleration acting on the automobile in a direction laterally thereof, and the magnitude of vibration occurring in the road wheels 1. A combination of two or more of these parameters may also be utilized in the practice of the present invention. However, the detector circuit 59 is preferably constructed as shown in FIGS. 7, 8, 9 and 10.

Figure 7:
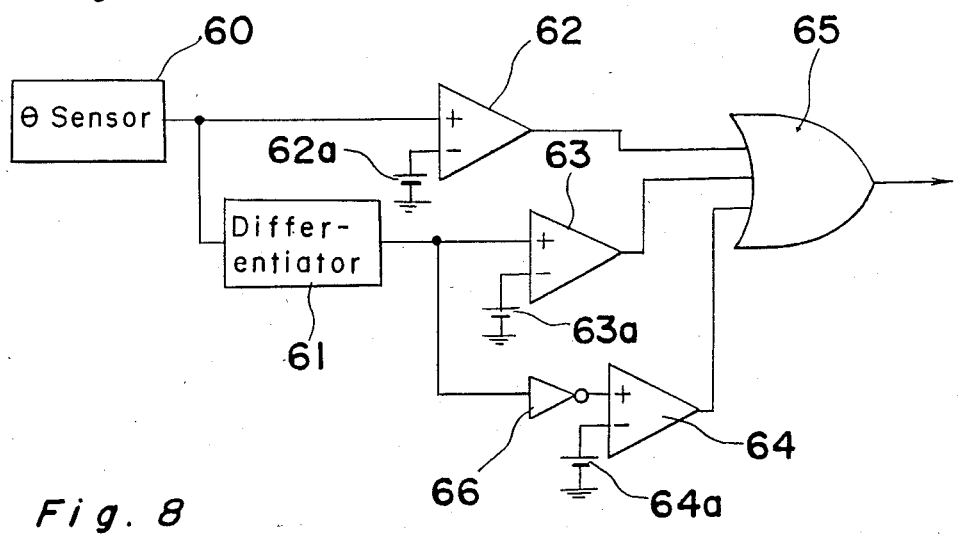
FIGS. 7, 8 and 9(a) are electric circuit block diagrams showing the details of a detector shown in FIG. 5 according to different embodiments of the present invention.

Referring first to FIG. 7, the detector circuit 59 comprises a sensor 60 for detecting, and generating an angle indicative of the angle $\theta$ of rotation of the steering wheel (which angle is hereinafter referred to as the steering wheel angle) about the steering shaft 13, a differentiating circuit 61 for generating a differentiated output proportional to the rate of change of the angle signal fed thereto from the angle sensor 60, first to third comparators 62, 63 and 64, and an OR gate 65 having its input terminals connected with the output terminals of the first to third comparators 62, 63 and 64. As shown the angle signal from the angle sensor 60 is fed not only to the differentiating circuit 61, but also to a non-inverting input terminal of the first comparator 62 having its inverting input terminal connected to a reference voltage generator 62a.

The differential output from the differentiating circuit 61 is connected direct to an non-inverting input terminal of the second comparator 63 and through an inverter 66 to a non-inverting input terminal of the third comparator 64, each of said second and third comparators 63 and 64 having its respective inverting input terminal connected to an associated reference voltage generator 63a or 64a.

Before the description of the function of the detector 59 shown in FIG. 7 proceeds, the reason for the use of the differentiating circuit 61 and of the other circuit components necessitated thereby will be discussed with reference to FIGS. 6(a) and 6(b).

As is well known to those skilled in the art, it often happens for the automobile driver to rotate the steering wheel even during the drive on a straight road, for example, when passing another car ahead. While the steering wheel angle $\theta$ during the cornering, i.e., during a period from the start of cornering to the completion thereof, changes generally as shown by a curve in FIG. 6(a), a certain compromise must be made that the rotation of the steering wheel through an angle $\theta a$ from the neutral position and back to the neutral position does not signify the actual cornering, but signifies the rotation of the steering wheel to pass another car ahead or to drive the automobile sideway to park or for some other purpose.

This compromise is, according to the embodiment shown in FIG. 7, elaborated by the reference voltage generated by the generator 62a and, accordingly, the first comparator 62 generates a high level signal when the steering wheel angle $\theta$ detected by the sensor 60 is greater than the predetermined angle $\theta a$.

However, in practice, a clear line of demarcation can hardly be drawn between the actual cornering and the condition of the road wheels being steered for some other purpose unless the driver conveys his intention to the control unit 58. Therefore, it is preferred that, regardless of the purpose for which the steering wheel is rotated, the detector 59 can generate its output to the control unit 58 substantially simultaneously with the start of rotation of the steering wheel so that the damping force exerted by the damper 15 can be reduced for the ease of the steering operation immediately after the steering wheel has been rotated.

Figure 6A:
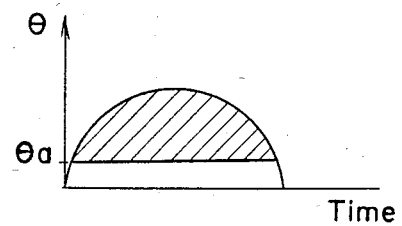
FIG. 6(a) is a graph showing the change in angle of rotation of a steering wheel from the start to end of the cornering of the automobile.
Figure 6B:
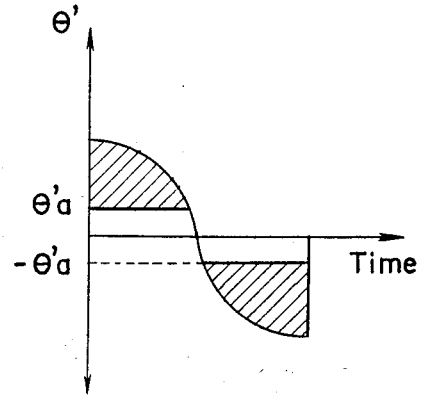
FIG. 6(b) is a graph showing the change of differentials of the angle shown in FIG. 6(a)

The steering wheel angle $\theta$ shown in FIG. 6(a), when differentiated with respect to time, exhibits such a curve as shown in FIG. 6(b). As can readily be understood from the comparison of the graphs of FIGS. 6(a) and 6(b), and considering the start of rotation of the steering wheel, the differentiating circuit 61 can generate a higher output voltage than that given by the sensor 60 and also than a predetermined voltage $\theta'a$ which is the uppermost limit of the range of voltage signifying that the road wheels are being steered. It is the predetermined voltage $\theta'a$ that is given by the reference voltage generator 63a and, accordingly, the second comparator 63 generates a high level output so long as the voltage fed from the differentiating circuit 61 is higher than the predetermined value $\theta'a$.

On the other hand, as the steering wheel having been rotated in one direction away from the neutral position is allowed to return to the initial neutral position, the differentiated value $\theta'$ having taken a positive sign takes a negative sign. When the negative differentiated value falls below a predetermined value $-\theta'a$, which is the lowermost limit of the voltage range referred to above and which is represented by the reference voltage fed to the third comparator 64 from the generator 64a, that is, when the voltage output from the differentiating circuit 61 which has been inverted from the negative sign to the positive sign by the inverter 66 becomes higher than the predetermined voltage of the reference voltage generator 64a, the third comparator 64 generates a high level output.

From the foregoing, it is clear that the detecting circuit 59 of the construction described above can generate its output immediately after the steering wheel has been rotated from the neutral position and keeps the generation of the output up until the completion of the return of the steering wheel to the neutral position regardless of the purpose for which the steering wheel is rotated.

Figure 8:
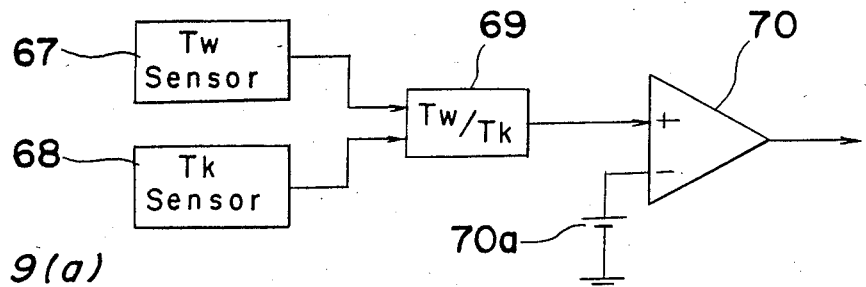

Although the sensor 60 has been described as capable of detecting, and generating a signal indicative of, the steering wheel angle $\theta$, it may detect, and generate a signal indicative of, the lateral displacement of the steering linkage, for example, that of either the connecting rod 9 or one of the tie rods 10, resulting from the rotation of the steering wheel.

Where the damper 15 is desired to be controlled in dependence on the efficiency of transmission of force between the steering wheel and the road wheels 1, the detector 59 shown in FIG. 5 is preferably constructed as shown in FIG. 8. The efficiency of transmission of force between the steering wheel and the road wheels hereinbefore and hereinafter referred to for the purpose of the present invention is to be understood as expressed in terms of both a torque ratio and an angle ratio. While the angle ratio will be discussed later, the torque ratio means the ratio of the torque Tk produced about one of the king pins (not shown) providing the respective points of pivot of the road wheels 1, relative to the torque Tw produced about the axis of rotation of the steering wheel, that is, Tw/Tk. This will be discussed before reference to FIG. 8 is made.

Assuming that the automobile driver rotates the steering wheel with the consequence that the torque Tw is produced about the axis of rotation of the steering wheel, the torque Tk produced about one of the king pins consequent upon the rotation of the steering wheel can be expressed by the following equation:

$$Tk = e \times Tw - f \qquad (1)$$

wherein e represents the intrinsic transmissibility of the particular steering system and f represents the friction acting on the road wheels.

Accordingly, the ratio, Tw/Tk, can be expressed as follows:

$$Tw/Tk = Tw/(e \times Tw - f) \qquad (2)$$

Since the denominator takes a value smaller than the numerator, the ratio is greater than 1, namely:

$$Tw/Tk > 1 \qquad (3)$$

On the other hand, when and so long as the steering wheel is held at the neutral position with no road wheels being steered, and when the road wheels receive an external disturbance which is then transmitted to the steering wheel tending to rotate, the torque produced about the axis of rotation of the steering wheel consequent upon the transmission of the external disturbance to the steering wheel can be expressed by the following equation:

$$Tw = e \times Tk - f \qquad (4)$$

$$\text{Thus, } Tw/Tk = (e \times Tk - f)/Tk \qquad (5)$$

In this case, since the denominator takes a value greater than the numerator:

$$Tw/Tk < 1 \qquad (6)$$

As can readily be understood from the equations (3) and (6) above, the torque ratio, Tw/Tk, takes different values in dependence on whether the road wheels are steered or whether they are not steered, and accordingly, a particular value of the torque ratio can provide an indication of the steering condition.

Referring now to FIG. 8, the detector 59 shown therein comprises sensors 67 and 68 for detecting, and generating different signals indicative of, the torques Tw and Tk produced about the axis of rotation of the steering wheel and about one of the king pins, respectively, and a divider circuit 69 having its input terminals connected with the respective sensors 67 and 68 and its output terminal to a non-inverting input terminal of a comparator 70 which serves to compare the voltage of an output from the divider 69 with a reference voltage fed from a reference voltage generator 70a to an inverting input terminal of the comparator 70. The reference voltage fed from the generator 70a is so selected as to correspond to the condition in which the torques Tw and Tk are equal to each other. Accordingly, it will readily be seen that the comparator 70 generates a high level signal only during the steering of the road wheels, which high level signal is fed to the control unit 59 so that the damping force exerted by the damper 15 can be eventually reduced for the ease of the steering operation in the manner as hereinbefore described.

In the embodiment shown in FIG. 8, instead of the combination of the sensors 67 and 68 for detecting the torques Tw and Tk, respectively, a combination of sensors for detecting the steering wheel angle $\theta$ and the angle $\theta k$ of pivot of one of the road wheels about the associated king pin can be employed. The reason therefore will now be described.

The relationship between the steering wheel angle $\theta$ and the angle $\theta k$ of pivot of the road wheel about the king pin (which angle is hereinafter referred to as the pivot angle $\theta k$), which is established when the steering wheel is actually rotated, can be expressed by the following equation:

$$\theta k = \theta/r - Tw/(r \times K) - p/r \qquad (7)$$

wherein r represents a ratio of reduction of the steering wheel angle $\theta$ relative to the pivot angle $\theta k$, p represents the play in the steering system, and K represents the rigidity of the steering gear system.

Accordingly, if the ratio of the steering wheel angle $\theta$ relative to the product of the reduction ratio r and the pivot angle $\theta k$, that is, $\theta/(r \times \theta k)$, is defined as meaning the actual transmissibility between the steering wheel and the road wheels, the efficiency of transmission of force, that is, the angle ratio, during the actual steering operation can be expressed by the following equation:

$$\theta/(r \times \theta k) = \theta/(\theta - Tw/K - p) \qquad (8)$$

Since the denominator in the equation (8) above is smaller than the numerator, hence:

$$\theta/(r \times \theta k) > 1 \qquad (9)$$

On the other hand, where the external disturbance acts on the road wheels 1 which is then transmitted to the steering wheel, the steering wheel angle $\theta$ can be given by the following equation:

$$\theta = r \times \theta k - (r \times Tk)/K - r \times p \qquad (10)$$

Accordingly, the efficiency of transmission during the external disturbance acting on the road wheels can be expressed by the following equation:

$$\theta/(r \times \theta k) = (\theta k - Tw/K - p)/\theta k \quad (11)$$

Hence, $\theta/(r \times \theta k) < 1$ \quad (12)

Therefore, the angle ratio can also be used to control the damping force exerted by the damper 15 substantially in the same way as that accomplished by the use of the torque ratio.

Figure 9A:
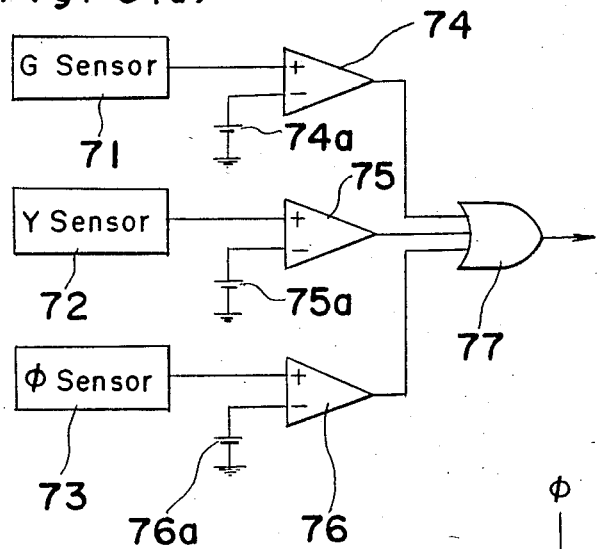
Figure 9B:
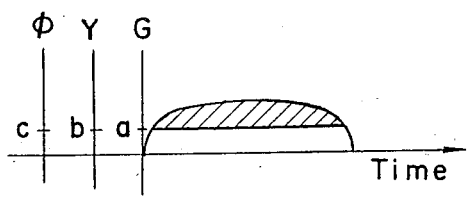
FIG. 9(b) is a chart showing the change in lateral acceleration acting on the automobile, the yawing rate and the rolling angle during the cornering.

In the embodiment shown in FIG. 9, the detector 59 comprises a combination of sensors 71, 72 and 73 for detecting the acceleration G acting on the automobile in a direction laterally thereof, the rate Y of yawing of the automobile, and the angle $\phi$ of rolling of the automobile, respectively. As is well known to those skilled in the art, when the steering wheel is rotated for the cornering, not only can the acceleration G in a direction laterally of the automobile act on the latter, but also the automobile tends to roll about the longitudinal sense of the automobile and to yaw about the vertical axis passing through the center of gravity of the automobile, with all of the acceleration G, the yawing rate Y and the rolling angle $\phi$ varying in a manner, as shown in FIG. 9(b), as the steering wheel is rotated from and back to the neutral position.

As shown in FIG. 9(a), comparators 74, 75 and 76 having their non-inverting input terminals connected respectively to the sensors 71, 72 and 73 and their inverting input terminals connected to respective reference voltage generators 74a, 75a and 76a serve to determine if the acceleration G, the yawing rate Y and the rolling angle $\phi$ have exceeded predetermined values a, b and c determined respectively by the reference voltages from the generators 74a, 75a and 76a. Accordingly, should at least one of the acceleration G, the yawing rate Y and the rolling angle $\phi$ exceed the predetermined value a, b or c, a high level output emerges from an OR gate 77 which is in turn fed to the control unit 58.

The construction of the detector 59 according to the embodiment shown in FIG. 9 is advantageous in that, since the tendency of the automobile to turn is high during the high speed drive even though the steering wheel angle $\theta$ is small, resulting in at least one of the factors G, Y and $\phi$ exceeding the respective predetermined value, the damper 15 can quickly respond to the actual behavior of the automobile to reduce the damping force.

Figure 10:
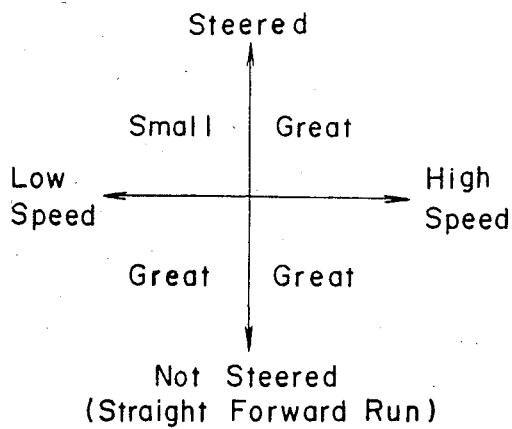
FIG. 10 is a diagram showing the damping force exerted by the damper in relation to the vehicle running velocity and the condition of the road wheel.
Figure 11:
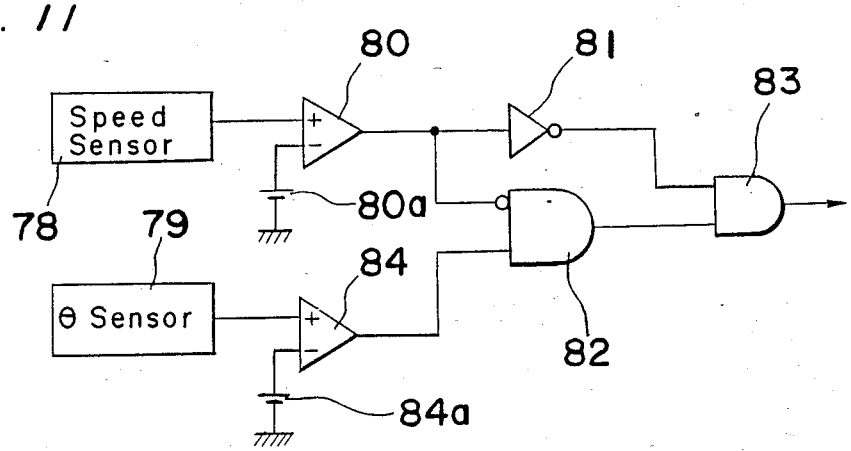
FIG. 11 is an electric circuit block diagram showing the details of the detector according to a further embodiment of the present invention, which is necessitated to establish the relationship shown in FIG. 10.

In the embodiment shown in FIGS. 10 and 11, the detector 59 is so constructed as to generate a high level signal to the control unit 58 only when the steering wheel is rotated during a low speed drive as shown in a diagram of FIG. 10. For this purpose, the detector 59 in the embodiment shown in FIG. 11 comprises a speed sensor 78 for detecting the running velocity of the automobile and generating a speed signal indicative of the running velocity, and an angle sensor 79 for detecting the steering wheel angle $\theta$ and generating an angle signal indicative of the steering wheel angle $\theta$. The speed signal is compared by a comparator 80 with a predetermined voltage fed from a reference voltage generator 80a and, when the running velocity exceeds a predetermined value determined by the predetermined voltage of the reference voltage generator 80a, the comparator 80 generates a high level signal which is in turn, after having been inverted by an inverter 81, fed to an AND gate 83. The output from the comparator 80 is also, after having been inverted, fed to one of the two input terminals of an AND gate 82 which has its output connected with the AND gate 83.

The angle signal from the angle sensor 79 is compared by a comparator 84 with a predetermined voltage fed thereto from a reference voltage generator 84a. If the steering wheel angle $\theta$ is greater and equal to or smaller than a predetermined value determined by the predetermined voltage of the reference voltage generator 84a, the comparator generates high and low level signals, respectively. Since the output of the comparator 84 is connected with the other of the input terminals of the AND gate 82, the latter generates a high level signal only when the comparators 80 and 84 generate low and high level signals, respectively. At the same time, since the low level signal from the comparator 80 is inverted by the inverter 81, the AND gate 83 generate a high level signal. This is illustrative of the situation wherein the running velocity is relatively low and the steering wheel angle $\theta$ is relatively great, and during this situation the damping force exerted by the damper 15 can be reduced as shown in FIG. 10.

Thus, during any of the other situations than that described above, the AND gate 83 generates a low level signal and, therefore, the stepper motor 16 will not be energized to bring the radial passage portion 35b into alignment with the radial passage 37 with the damper 15 consequently exerting a relatively great damping force.

Although the sensor 79 has been described as capable of detecting the steering wheel angle $\theta$, it may be of a type capable of detecting the force of grip applied by the driven to the steering wheel, or the magnitude of vibration occurring in the steering system. Alternatively, where a logic circuit similar to that shown in FIG. 9(a) is employed as connected to the comparator 84, a combination of two or more of the sensors referred to in the specification of the present invention can be employed. This also equally applies to the logic circuit shown in any one of FIGS. 7 and 8. In any event, where a logic circuit similar to that shown in any of FIGS. 7, 8 and 9(a) is employed in place of the sensor 79, the comparator 84 may be omitted together with its associated reference voltage generator 84a.

Figure 12:
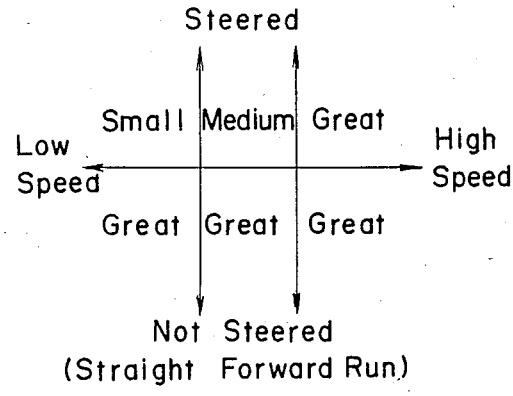
FIG. 12 is a diagram similar to FIG. 10, which is to be achieved in a still further embodiment of the present invention.
Figure 13:
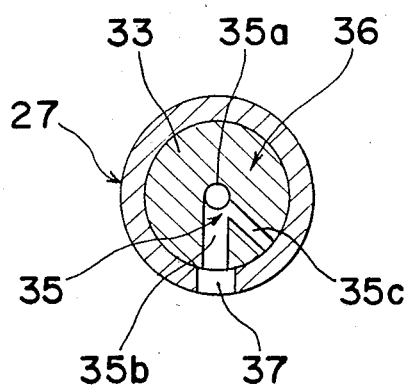
FIG. 13 is a cross-sectional view of a valving mechanism of the damper, showing a modification thereof necessitated to achieve the relationship shown in FIG. 12.

Referring now to FIG. 13, where the valve head 36 shown in FIGS. 3 and 4 is additionally formed with a second radial passage portion 35c having a diameter smaller than that of the radial passage portion 35b and communicated with the axial passage portion 35a and, simultaneously therewith, where the stepper motor 16 has, in addition to the first and second positions for bringing the radial passage portion 35b out of and into alignment with the radial passage 37, an intermediate position at which the second radial passage portion 35c can be fluid-connected with the radial passage 37, the damping force exerted by the damper 15 can be controlled in a manner as shown in the diagram of FIG. 12. Specifically, by using a logic circuit for the detector 59 which is similar to that shown in FIG. 11, it is possible to control the damper 15 so as to exert a relatively small damping force when the road wheels are steered at a relatively low running velocity, a medium damping force when the road wheels are steered at a medium running velocity, and a relatively great damping force when the road wheels are steered at a relatively high running velocity and when the automobile is driven straight forward irrespective of the running velocity.

From the foregoing description, it has now become clear that the transmission of the wheel shimmy and/or the wheel kickback to the steering wheel can advantageously be minimized during the straight forward run of the automobile because of the relatively great damping force exerted by the damper during that time. On the other hand, during the cornering of the automobile, the damper is switched to exert a relatively small damping force for the ease of the steerability.

Although the present invention has been fully described in connection with the preferred embodiments thereof with reference to the accompanying drawings, it is to be noted that various changes and modifications are apparent to those skilled in the art. By way of example, a control circuit for controlling the stepper motor including the control unit 58 may be constituted by a microcomputer, in which case the microcomputer may be programmed so as to generate a voltage signal for the stepper motor in response to the output signal from the detector circuit 59.

In addition, though the piston assembly has been described as including the check valves on respective sides of the piston body, they may not be always necessary and where they are omitted, the piston body may have the only passage communicating between the chambers within the interior of the tube assembly. Alternatively, both of the check valves, the passages defined in the piston body may be omitted, in which case the valve head is so designed as to adjust the resistance of flow of the fluid medium from one chamber to another within the interior of the tube assembly depending on the position of the stepper motor.

Moreover, although reference to the stepper motor has been made as a drive for rotating the valving shaft and, hence, the valve head, a rotary solenoid or any other motor may be employed therefor.

Accordingly, such changes and modifications are to be understood as included within the scope of the present invention as defined by the appended claims, unless they depart therefrom.

We claim:

1. A steering system in an automobile comprising, in combination:
    a steering wheel assembly including a steering wheel and a steering shaft rotatable together with said steering wheel;
    a steering linkage connecting between spaced apart wheel carriers for the support of respective road wheels thereon;
    a steering gear operatively connecting between the steering shaft and the steering linkage for, when the steering wheel is rotated in one of the opposite directions from a neutral position, causing the steering linkage to displace in one of the opposite directions generally longitudinally thereof for steering the road wheels, said steering wheel assembly, said steering linkage and said steering gear altogether constituting a motion transmitting mechanism for transmitting a rotary motion of the steering wheel to the road wheels;
    an adjustable damper capable of exerting an adjusted damping force and disposed between a portion of a body structure of the automobile and a portion of the steering linkage for minimizing an oscillatory motion of the steering linkage in a direction generally longitudinally thereof;
    means for adjusting the damping force exerted by the damper;
    a first means for detecting a parameter representative of the steered condition of the road wheels and generating a parameter output indicative of the parameter when said parameter detected thereby deviates from a predetermined quantity;
    a second means for detecting, and generating a velocity signal indicative of, the velocity of run of the automobile; and
    a control means capable of generating a control signal only when the parameter exceeds the predetermined quantity during a low speed drive of the automobile, said adjusting means being activated in response to the control signal to reduce the damping force exerted by the damper.

2. A system as claimed in claim 1, wherein said parameter is the angle of rotation of the steering wheel.

3. A system as claimed in claim 1, wherein said damper is a fluid-sealed, direct-acting damper comprising a generally elongated tube assembly having a hydraulic medium filled in the interior thereof and having one end connected to the portion of one of the steering linkage and the body structure; a generally elongated plunger means having one end connected to the portion of the other of the steering linkage and the body structure, the other end of said plunger means being positioned within the interior of the tube assembly for movement relative to the tube assembly and dividing the interior of the tube assembly into first and second fluid chambers; a passage means defined in the other end of the plunger means for communicating between the first and second fluid chambers; and a reservoir means for accommodating a portion of the hydraulic medium within the tube assembly in a varying quantity required to compensate for change in volume of the tube assembly resulting from the movement of the plunger means relative to the tube assembly, and wherein said adjusting means is operable to adjust the effective cross-sectional area of said passage means thereby to adjust the resistance to the flow of the hydraulic medium through the passage means, which resistance is a function of the damping force exerted by the damper.

4. A system as claimed in claim 3, wherein said parameter is the angle of rotation of the steering wheel.

5. A system as claimed in claim 3, wherein said adjusting means is operable to adjust the effective cross-sectional area of the passage means to maximum, intermediate and minimum values one at a time, the maximum value being attained when the parameter exceeds the predetermined quantity during the low speed drive of the automobile, said intermediate value being attained only when the parameter exceeds the predetermined quantity during a medium speed drive of the automobile, and said minimum value being attained when the parameter is below the predetermined quantity regardless of the running velocity of the automobile.

6. A system as claimed in claim 3, wherein said adjusting means comprises a valving shaft rotatably extending coaxially through the plunger means and having one end provided with a valve head for adjusting the effective cross-sectional area of the passage means, and a stepper motor having its drive shaft connected with the other end of the valving shaft, said stepper motor being operable to increase the effective cross-sectional area of the passage means thereby to reduce the resistance to the flow of the hydraulic medium through said passage means when the road wheels are appreciably steered.

7. A steering system in an automobile comprising, in combination:

a steering wheel assembly including a steering wheel and a steering shaft rotatable together with said steering wheel;

a steering linkage connected between spaced apart wheel carriers for the support of respective road wheels thereon;

a steering gear operatively connecting between the steering shaft and the steering linkage for, when the steering wheel is rotated in one of the opposite directions from a neutral position, causing the steering linkage to displace in one of the opposite directions generally longitudinally thereof for steering the road wheels, said steering wheel assembly, said steering linkage and said steering gear constituting a motion transmission mechanism for transmitting a rotary motion of the steering wheel to the road wheels;

an adjustable damper for exerting an adjusted damping force and disposed between a portion of a body structure of the automobile and a portion of the steering linkage for minimizing an oscillatory motion of the steering linkage in a direction generally longitudinally thereof;

means for adjusting the damping force exerted by the damper;

a first means for detecting and generating an output signal indicative of the displacement of the motion transmitting mechanism;

a second means operable in response to the output signal from the first means for calculating and generating a differentiated signal indicative of the differential of the displacement of the motion transmitting mechanism with respect to time; and a control means operable in response to the signals from said first and second means for generating a control signal to said adjusting means, said control signal reducing the damping force of the damper when the displacement of the motion transmitting mechanism is greater than a predetermined value and when the differential calculated by said second means is greater than a predetermined value.

8. A system as claimed in claim 7, wherein said first means comprises a sensor for generating an output signal indicative of the angle of rotation of the steering wheel.

9. A system as claimed in claim 8, wherein said control means comprises a first comparator connected with said sensor for determining if the angle of rotation of the steering wheel from the neutral position exceeds a first predetermined value and for generating a first signal only when the angle has exceeded the first predetermined value, a second comparator connected with said second means for determining if the differential of the angle exceeds a second predetermined value and for generating a second signal only when the differential of the angle has exceeded the second predetermined value, an absolute means connected with said second means for determining the absolute value of said differential, and a third comparator connected with said absolute means for determining if the absolute value exceeds a third predetermined value and for generating a third signal only when said absolute value has exceeded the third predetermined value, and a gating means operable in response to one of said first to third signals to issue said output to the control means.

10. A steering system in an automobile comprising, in combination:

a steering wheel assembly including a steering wheel and a steering shaft rotatable together with said steering wheel;

a steering linkage connected between spaced apart wheel carriers for the support of respective road wheels thereon;

a steering gear operatively connected between the steering shaft and the steering linkage for, when the steering wheel is rotated in one of the opposite directions from a neutral position, causing the steering linkage to displace in one of the opposite directions generally longitudinally thereof for steering the road wheels, said steering wheel assembly, said steering linkage and said steering gear constituting a motion transmitting mechanism for transmitting a rotary motion of the steering wheel to the road wheels;

an adjustable damper for exerting an adjusted damping force disposed between a portion of a body structure of the automobile and a portion of the steering linkage for minimizing an oscillatory motion of the steering linkage in a direction generally longitudinally thereof;

means for adjusting the damping force exerted by the damper;

means for detecting and generating an output signal indicative of the efficiency of transmission of force between the steering wheel and the road wheels; and a control means operable in response to the output signal from said efficiency detecting means for generating a control signal to said adjusting means, said control signal reducing the damping force of the damper when the efficiency of transmission of force therebetween is higher than predetermined value.

11. A system as claimed in claim 10, wherein said transmission efficiency is the ratio of the torque produced about a king pin providing respective points of pivot of the road wheels, relative to the torque produced about the axis of rotation of the steering wheel.

12. A steering system in an automobile comprising, in combination:

a steering wheel assembly including a steering wheel and a steering shaft rotatable together with said steering wheel;

a steering linkage connected between spaced apart wheel carriers for the support of respective road wheels thereon;

a steering gear operatively connected between the steering shaft and the steering linkage for, when the steering wheel is rotated in one of the opposite directions from a neutral position, causing the steering linkage to displace in one of the opposite directions generally longitudinally thereof for steering the road wheels, said steering wheel assembly, said steering linkage and said steering gear constituting a motion transmitting mechanism for transmitting a rotary motion of the steering wheel to the road wheels;

an adjustable damper for exerting an adjusted damping force disposed between a portion of a body structure of the automobile and a portion of the steering linkage for minimizing an oscillatory motion of the steering linkage in a direction generally longitudinally thereof;

means for adjusting the damping force exerted by the damper;

means for detecting and generating an output signal indicative of the automobile tendency to turn in one of the opposite lateral directions; and a control means operable in response to the output signal from said tendency detecting means for generating a control signal to said adjusting means, said control signal being used to reduce the damping force of the damper when the tendency represents an initial state of turn of the automobile in one of the opposite lateral directions.

13. A system as claimed in claim 12, wherein said tendency of the automobile to turn is represented by one of: acceleration acting on the automobile in a direction laterally of the longitudinal sense of the automobile, rate of yawing of the automobile, and angle of rolling of the automobile.

* * * * *